United States Patent
Kawamoto et al.

(10) Patent No.: US 7,640,360 B1
(45) Date of Patent: Dec. 29, 2009

(54) NETWORK SYSTEM INCLUDING A TERMINAL DEVICE CAPABLE OF REGISTERING WITH A SERVER

(75) Inventors: Yoji Kawamoto, Tokyo (JP); Isao Hidaka, Tokyo (JP); Tomohiro Tsunoda, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/518,808

(22) Filed: Mar. 3, 2000

(30) Foreign Application Priority Data

Mar. 3, 1999 (JP) .............................. P11-055625

(51) Int. Cl.
*G06F 15/16* (2006.01)
(52) U.S. Cl. .................. 709/246; 709/203; 709/206
(58) Field of Classification Search ............ 365/185.04, 365/185.11, 185.29, 185.33, 189.07; 340/5.74, 340/5.85, 7.34, 7.54; 709/224, 229, 203, 709/206, 246; 713/155–156, 200–202, 340, 713/183, 159; 714/42, 764; 725/6
See application file for complete search history.

(56) References Cited

U.S. PATENT DOCUMENTS

| | | | | |
|---|---|---|---|---|
| 4,888,773 A | * | 12/1989 | Arlington et al. | 714/764 |
| 5,067,154 A | * | 11/1991 | Hosobuchi et al. | 713/201 |
| 5,193,114 A | * | 3/1993 | Moseley | 713/183 |
| 5,224,163 A | * | 6/1993 | Gasser et al. | 380/30 |
| 5,237,614 A | * | 8/1993 | Weiss | 713/159 |
| 5,261,052 A | * | 11/1993 | Shimamoto et al. | 709/206 |
| 5,268,963 A | * | 12/1993 | Monroe et al. | 713/186 |
| 5,326,104 A | * | 7/1994 | Pease et al. | 463/18 |
| 5,347,580 A | * | 9/1994 | Molva et al. | 713/159 |
| 5,436,621 A | * | 7/1995 | Macko et al. | 340/7.54 |
| 5,506,961 A | * | 4/1996 | Carlson et al. | 713/200 |
| 5,537,584 A | * | 7/1996 | Miyai et al. | 714/42 |
| 5,648,929 A | * | 7/1997 | Miyamoto | 365/185.04 |
| 5,706,427 A | * | 1/1998 | Tabuki | 713/201 |
| 5,892,902 A | * | 4/1999 | Clark | 713/201 |
| 5,966,448 A | * | 10/1999 | Namba et al. | 380/33 |
| 5,978,568 A | * | 11/1999 | Abraham et al. | 709/224 |
| 6,003,136 A | * | 12/1999 | Schanze | 713/201 |
| 6,697,836 B1 | * | 2/2004 | Kawano et al. | 709/202 |

FOREIGN PATENT DOCUMENTS

| | | |
|---|---|---|
| JP | 01-135253 A | 5/1989 |
| JP | 3-256426 A | 11/1991 |
| JP | 04-170142 A | 6/1992 |
| JP | 07-170332 A | 7/1995 |

* cited by examiner

*Primary Examiner*—George C Neurauter, Jr.
(74) *Attorney, Agent, or Firm*—Lerner, David, Littenberg, Krumholz & Mentlik, LLP

(57) ABSTRACT

A network system, terminal device and network server specify the user on the network even if the user uses any one of the terminal devices in the network system to which terminal devices and network server are connected via the predetermined communication system. When the user uses the terminal device 12, 13, 31 or 47, by transmitting the user private information and the user operating terminal device specific information to the network server 22 as the specific information, the network server 22 can specify the terminal device 12, 13, 31 or 47 in use by the user.

2 Claims, 8 Drawing Sheets

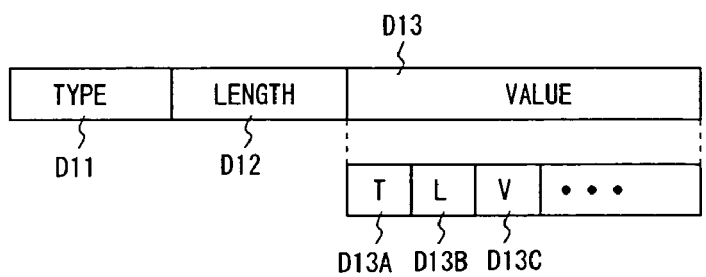

```
00 : NETWORK CONNECTION INFORMATION    AUTHENTICATION ID, PASSWORD···
01 : NETWORK ADDITIONAL INFORMATION    GROUP ID, PASSWORD···
02 : PERSONAL INFORMATION              TELEPHONE DIRECTORY DATA,
                                       ADDRESS BOOK DATA, SCHEDULE DATA···
03 : INFORMATION PER TERMINAL          TERMINAL ATTRIBUTES, I.E.,
                                       TELEVISION, PC, PORTABLE TELEPHONE
                                       MEDIA ATTRIBUTES, I.E, TEXT,
                                       STILL PICTURE, MOVING PICTURE,
                                       SPEECH, MUSIC FORMAT, SUCH AS HTML,
                                       GIF, JPEG, MPEG, MP3, ATRAC
04 : ADDITIONAL INFORMATION
```

FIG. 5

NETWORK SYSTEM INCLUDING A TERMINAL DEVICE CAPABLE OF REGISTERING WITH A SERVER

BACKGROUND OF THE INVENTION

1. Field of the Invention

The present invention relates to a network system, terminal device and network server, and more particularly, is suitably applied to the network system, terminal device and network server for specifying the terminal device that is being used by the user who uses various terminal devices.

2. Description of the Related Art

Heretofore, there has been a system that offers various informations to the user terminal device, i.e., the personal computer, from the information providing means, i.e., the internet service provider (ISP) via the network such as internet.

In such system, the user operating the personal computer, by entering the identification (ID) and password for connecting to the service provider into the personal computer, the personal computer receives an authentication for receiving information from the service provider using the input ID and password.

In the conventional network system, such as shown in FIG. 1, a personal computer 2 is connected to the telephone line 4 via a modem 3, and a server 5B of the service provider 5 is connected to the telephone line 4 via an access server 5A.

Moreover, a network 8 constructed such as by the local area network (LAN) in the company is connected to the server 5B of the service provider 5 via Internet 7. In this case the personal computer 8B of the network 8 is connected to the Internet 7 via the firewall 8A, thus preventing the invasion of the third party into the network 8 from the outside.

However, in such system, the user had to use the mail address, connecting telephone number or ID properly in each network depending on when he uses the network 8 of the company, the service provider 5 using his personal computer 2 in his home and when he uses the portable telephone (not shown in Fig.).

Furthermore, if the user has contracts with the plural number of providers, it is necessary for the user to use the mail address, connecting telephone number or the authenticated ID in each provider properly, and it caused a problem in usability.

Furthermore, in the conventional system, when the user was connected to the network by using either one (television, portable telephone, personal digital assistance (PDA), etc) from among various terminals, it was difficult to specify the user in the network.

SUMMARY OF THE INVENTION

In view of the foregoing, an object of this invention is to provide a network system, terminal device and network server in which the user in the network can be specified even though the user uses either one of the terminals.

The foregoing object and other objects of the invention have been achieved by the provision of a network system, terminal device and network server. When the user uses the terminal device, he transmits the user specific information and the terminal device specific information that the user uses to the network server as the specific information. The network server memorizes the specific information sent from the terminal in the database, and by detecting the database, can specify the terminal device being used by the user.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a brief linear diagram showing the data format in the memory card;

DETAILED DESCRIPTION OF THE EMBODIMENT

Figure 1:
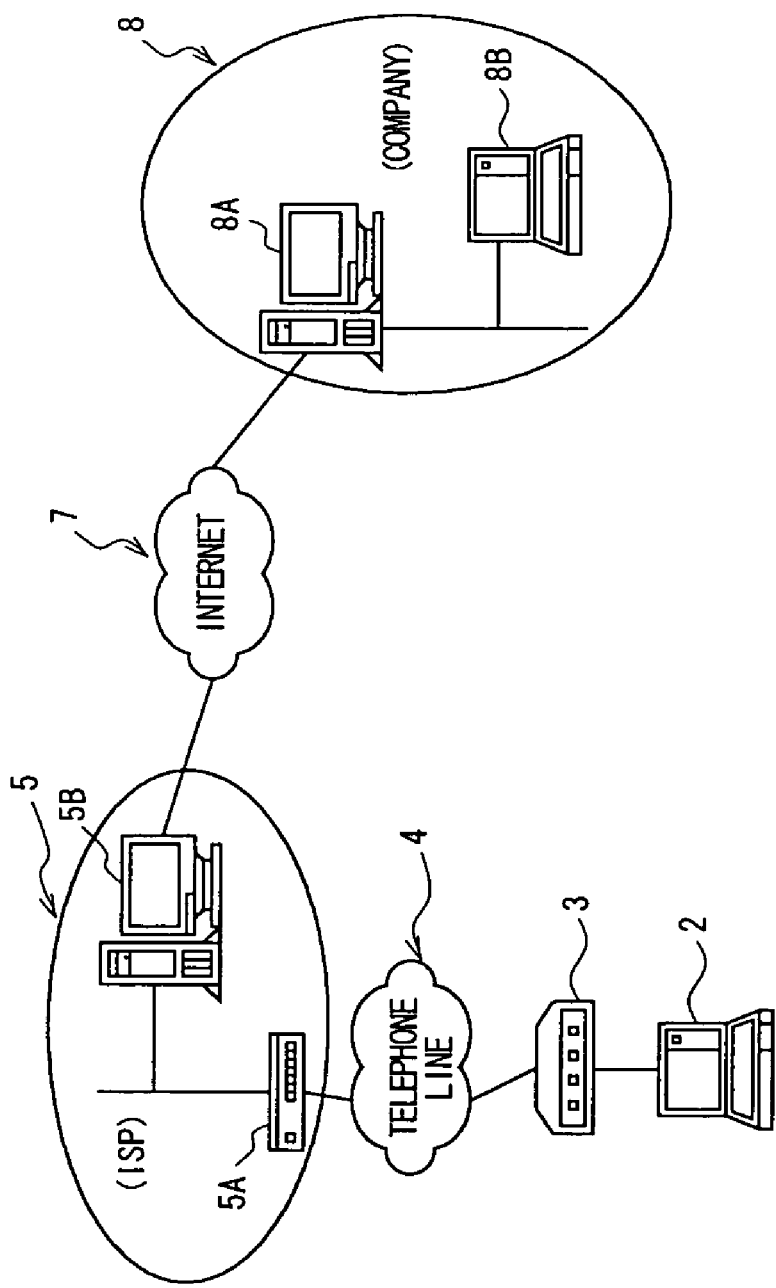
FIG. 1 is a brief linear connection diagram showing the construction of the conventional network system.
Figure 2:
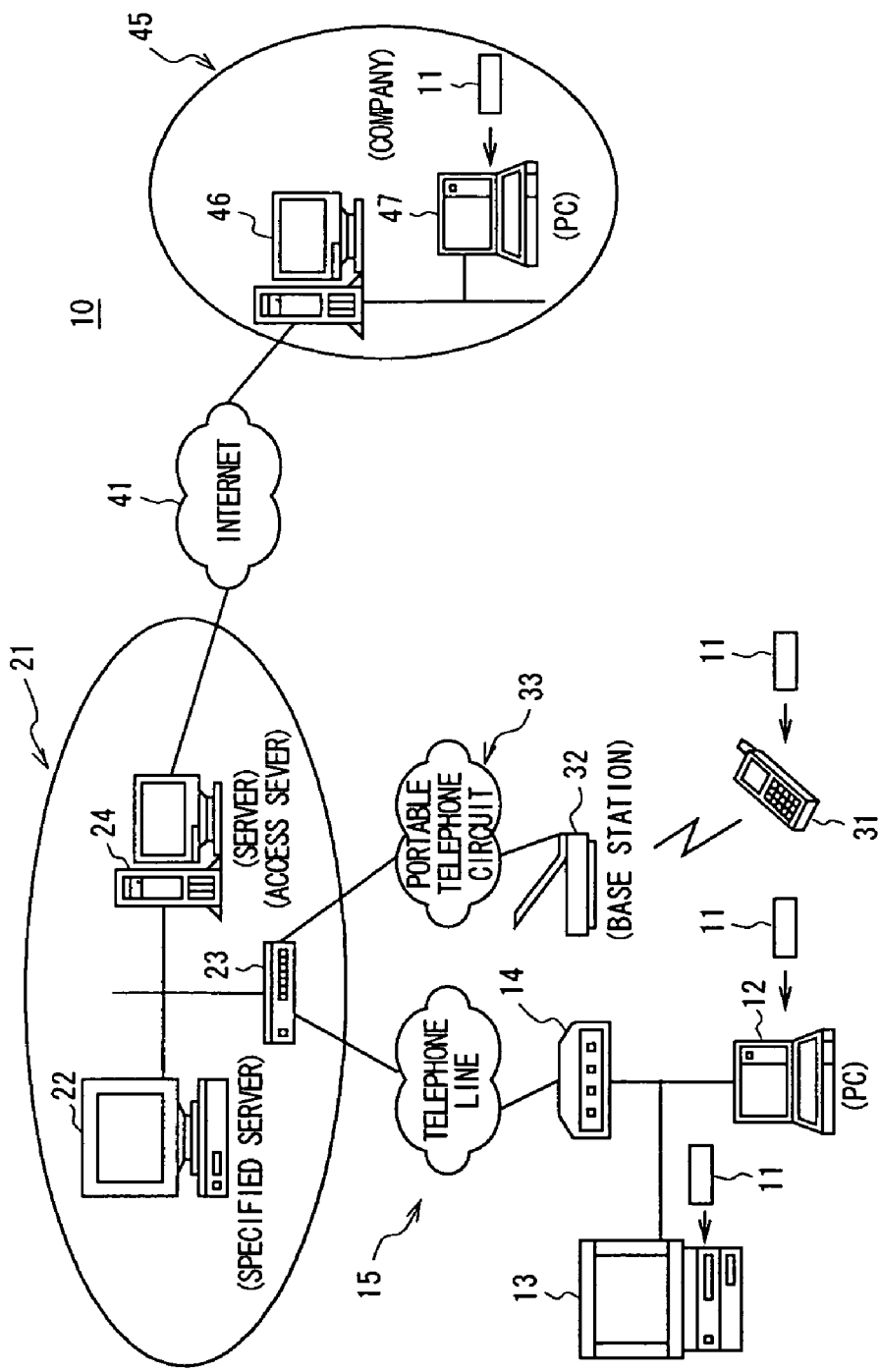
FIG. 2 is a brief linear connection diagram showing the general construction of a network system according to the present invention.

Preferred embodiments of this invention will be described with reference to the accompanying drawings:

In FIG. 2, 10 generally shows a network system, and a service provider 21 is connected to telephone line 15 and portable telephone line 33 via an access server 23.

The telephone line 15 is connected to terminal devices, i.e., a television set 13 and a personal computer (PC) 12 via a modem 14. And the television set 13 and the personal computer 12 can access to the service provider 21 via the telephone line 15. Moreover, the portable telephone line 33 is connected to the portable telephone 31 via the base station 32, and the portable telephone 31 can access to the service provider 21 via the portable telephone line 33.

In addition to the above, the service provider 21 is connected to the internet 41 via a server 24. And the network 45 consists of such as local area network (LAN) of the company that is connected to the internet 41 via the private line can access to the service provider 21 via the internet 41. In this case, the personal computer 47 of the network 45 is connected to the Internet 7 via the firewall 46, and thus prevented from the invasion of the third party into the network 45 from the outside.

Here, each terminal device (television set 13, personal computer 12, 47 and portable telephone 31) is equipped with a slot to load a memory card, that is a memory means. And when operating these terminal devices, the user places his personal memory card 11 to the terminal that he is operating.

Figure 3:
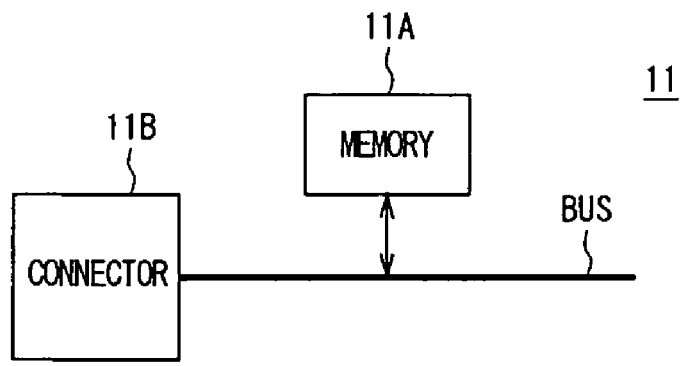
FIG. 3 is a block diagram showing he construction of a memory card according to the present invention.

As shown in FIG. 3, the memory card 11 is comprised of a connector 11B for loading to the slot of each terminal device and a memory 11A connected to the connector 11B via a bus BUS.

Figure 4:
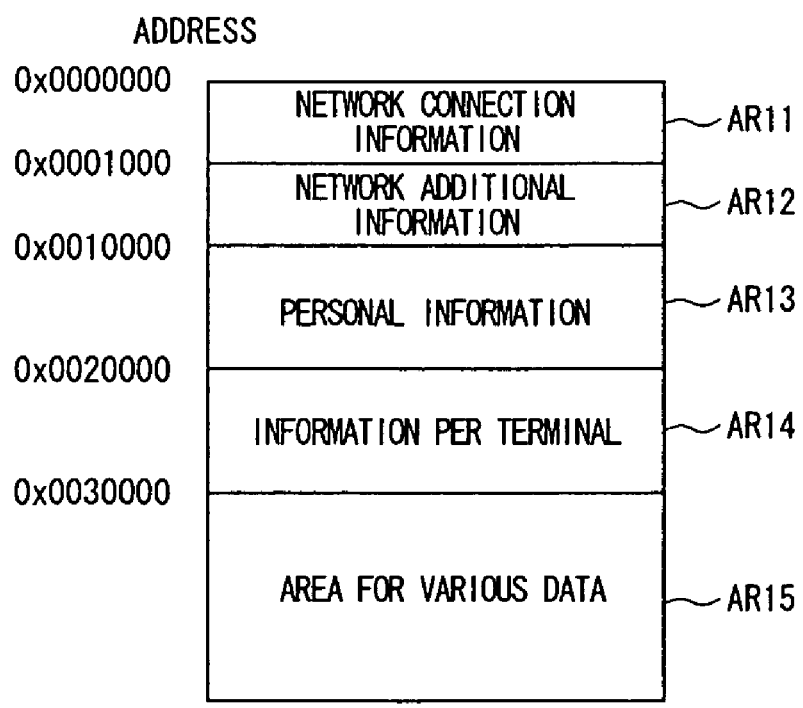
FIG. 4 is a brief linear diagram showing a memory map of the memory card.

The memory 11A memorizes various personal information of the user who owns the memory card 11 in the area specified by the memory map shown in FIG. 4. More specifically, in the memory area of this memory 11A, the first area AR11 is an area to memorize the network connection information for connecting the terminal device loaded with the memory card 11 to the network. And this first area AR11 memorizes the user ID and password for receiving the authentication from the service provider 21 and the password for user identification registered by the user who uses the memory card 11 in advance. The password for user identity is the information to be compared with the password supplied by the user in each time when the user inserts the memory card 11 into the terminal device. And this is used to judge whether the user at this time is the authorized user to use the memory card or not.

Furthermore, the second area AR12 is an area to memorize additional information to be downloaded when receiving various services (provide information) on the network from the service provider 21 using the terminal device loaded with the memory card 11.

Furthermore, the third area AR13 is an area to memorize the user personal information, such as address book or schedule data, of the user who owns the memory card 11.

Moreover, the fourth area AR14 is an area to memorize usable information in each terminal device loaded with the memory card 11. More specifically, if the terminal device to be loaded with the memory card 11 is the television set 13, the uniform resource locator (URL) information for observing the explanation on the world wide web (WWW) per the television program calendar to be used or the television program, and if the terminal device to be loaded with the memory card 11 is the personal computer 12, the sentence or screen on the process of editing or the program under developing, and if the terminal device to be loaded is a portable telephone 31, character mail service data to be transmitted/received will be memorized respectively.

Furthermore, the fifth area AR15 is an area to memorize various types of data such as still pictures.

The data to be stored in the memory 11A of the memory card 11 is stored in the form such as the type length value (TLV) format shown in FIG. 5. This format is the format of data to be stored in each area (AR11 to AR15) of the memory map described above in FIG. 4, and each area (AR11 to AR15) consists of data type (TYPE) information D11, data length (LENGTH) information D12 and value (VALUE) information D13.

In this case, as the data type information D11 of the first area AR11 of the memory 11A, the code "00" showing the network connection information is allocated. And as the value information D13 of the first area AR11, information such as the authentication ID (user ID) and password will be stored. Moreover, TLV type format will be formed in each ID and password to be stored as the value information D13, and the type information D13A, data length information D13B and value information D13C will be formed respectively.

Moreover, in the second area AR12 of the memory 11A, the code "01" showing the network additional information is allocated as the data type information D11, and additional information such as group ID and its password to be downloaded when receiving various services on the network from the service provider 21 will be stored as the value information of the second area AR12. The group ID is the identification information to be used when forming the specific group by the plural number of users who use the terminal. And then, the TLV type format will be formed per the group ID and its password to be stored as the value information D13, and type information D13A, data length information D13B and the value information D13C will be formed respectively.

Furthermore, in the third area AR13 of the memory 11A, the code "02" showing the personal information is allocated. And as the value information of the third area AR13, the information, such as the telephone directory, address data and personal schedule data, to be used personally by the user having the memory card 11, will be stored. And moreover, the TLV type format will be formed per the telephone directory, address data and personal schedule data to be stored as the value information D13, and the type information D13A, data length information D13B and the value information D13C will be formed respectively.

Furthermore, in the fourth area AR14 of the memory 11A, the code "03" showing the information in each terminal is allocated as the data type information D11. And as the value information of the fourth area AR14, various kinds of terminal attributes as the information to be used per the terminal device to be loaded with the memory card 11 will be stored. And moreover, the TLV type format will be formed per the information such as a variety of terminal attributes to be stored as the value information D13C, and the type information D13A, data length information D13B and the value information D13C will be formed respectively.

Furthermore, in the fifth area AR15 of the memory 11A, various kinds of data to be read and written optionally will be stored as the data type information D11. And furthermore, the TLV type format will be formed per the data to be stored as the value information D13 and the type information D13A, data length information D13B and the value information D13C will be formed respectively.

Thus, the private information (such as ID, password) to specify the user who owns the memory card 11 and various information to be used by the user personally (personal information, information per terminal) will be memorized in the memory card 11. And when the user operates each terminal device, inserting the memory card 11 into the operating terminal, the user informs the network connection information, that is the personal information to specify the user (authentication ID, password) to the specified server 22 of the service provider 21 via the operating terminal. And at this point, the relationship between the user operating terminal device and the user will be registered at the specified server 22.

Figure 6:
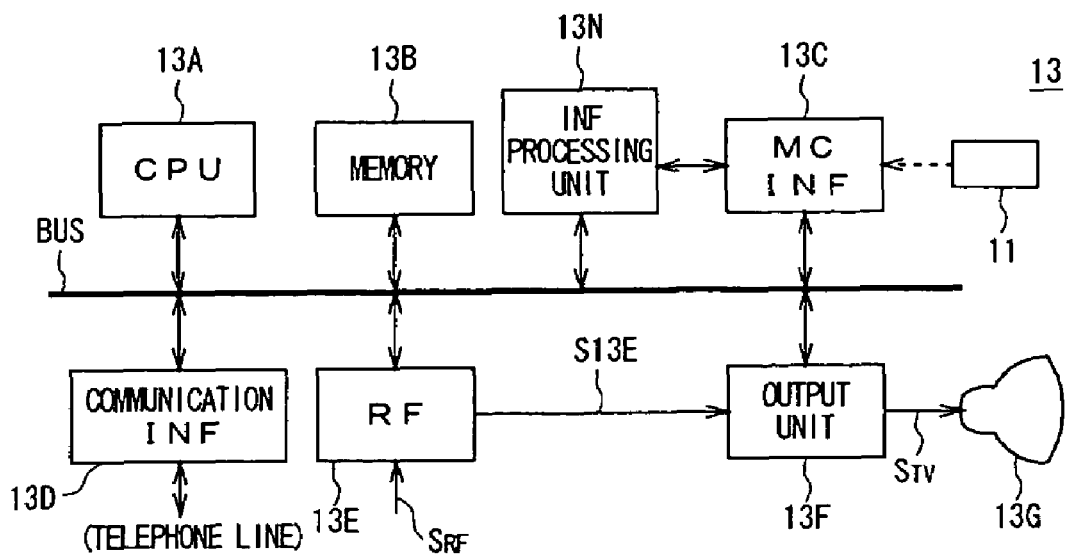
FIG. 6 is a block diagram showing the construction of a television set.

As shown in FIG. 6, the television set 13 as the first terminal device comprises a data bus BUS connected respectively to a CPU 13A, memory 13B, memory card (MC) interface (INF) 13C, interface processing unit 13N, communication interface (INT) 13D, receiver circuit (RF) 13E and output unit 13F. The CPU 13A executes various operations according to the operation program stored in the memory 13B and controls each circuit unit according to the operations.

The radio frequency (RF) unit 13E receives television broadcast wave $S_{RF}$ received via an antenna (not shown in Fig.) and transmits the received signal S13E to the output unit 13F. The output unit 13F, by applying such as the intermediate frequency amplification processing, video detection processing to the received signal S13E, forms a television video signal $S_{TV}$. And then, the output unit 13F, by sending this television video signal out to the cathode ray tube display (CRT) 13G, visually displays the television broadcast received at the RF unit 13E on the display screen of the CRT 13G.

When the user who is operating the television set 13 inserts his owned memory card 11 into the slot for memory card (not shown in Fig.), the contact point for detection of the memory card 11 is connected to the contact point of the memory card interface 13C. Then, the interface processing unit 13N detects the change of signal level for memory card detection (change from the logical "L" level to the logical "H" level) and thus, the interface processing unit 13N conducts the interrupt processing by outputting the interrupt signal to the CPU 13A. In this connection, the interface processing unit 13N is a processing block to conduct the protocol processing according to the interface specifications in receiving data with regard to the memory card 11. Thus, the interface processing unit 13N becomes in a state capable of reading out the user specific information memorized in the memory card 11.

The memory card interface 13C is comprised of serial interface and consists of at least 3 data lines. The first data line transmits a clock signal when transmitting the data, the second line transmits status signal necessary for transmitting the data, and the third data line transmits data to be written in the memory card 11 or read out serially.

Then, the CPU 31A reads out data from the memory card 11 via the memory card interface 13C and by transmitting this to the specified server 22 of the service provider 21 via the communication interface 13D, the modem 14 (FIG. 2) and the telephone line 15 (FIG. 2), conducts the authentication request to the specified server 22.

Figure 7:
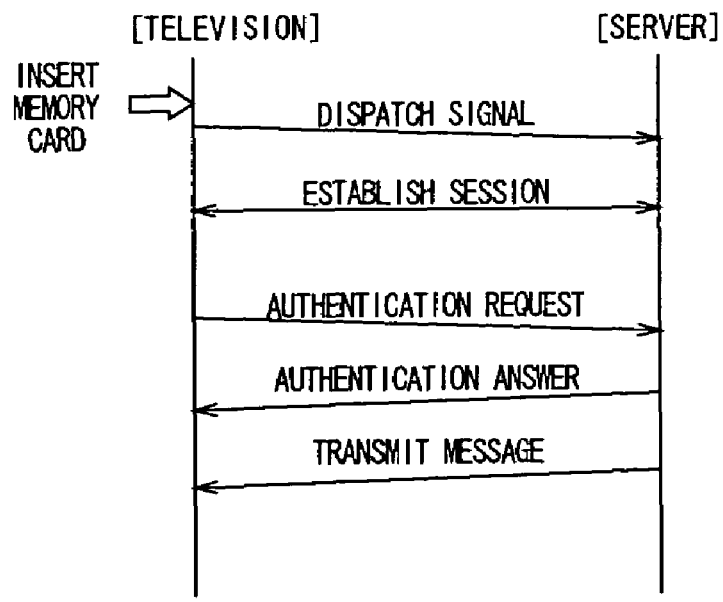
FIG. 7 is a brief linear diagram showing the authentication sequence between the television set and the specified server.

This authentication request sequence will be shown in FIG. 7. In FIG. 7, when the memory card 11 is loaded onto the television set 13, the CPU 13A detects the loading condition of the memory card 11 via the memory card interface 13C and sends out a signal to the service provider 21 having the specified server 22 via the telephone line 15 and secures the communication path.

Then, the CPU 13A of the television set 13, after obtaining the session by the Point to point protocol (PPP) processing, transmits the authentication request to the specified server 22. This authentication request data D21 is the specific information to specify user and the terminal that the user uses. And as the authentication request data D21, the CPU 13A transmits the information for user specification formed of user ID and password for authentication in the network connection information (FIG. 4) stored in the memory card 11, the terminal type data (data showing the television set) stored in the memory 13B of the television set 13 in advance, the information to specify the signal dispatching means, and the information for terminal specification consists of the telephone number of signal transmitting source of the television set side and various optional data to the specified sever 22.

Figure 8:
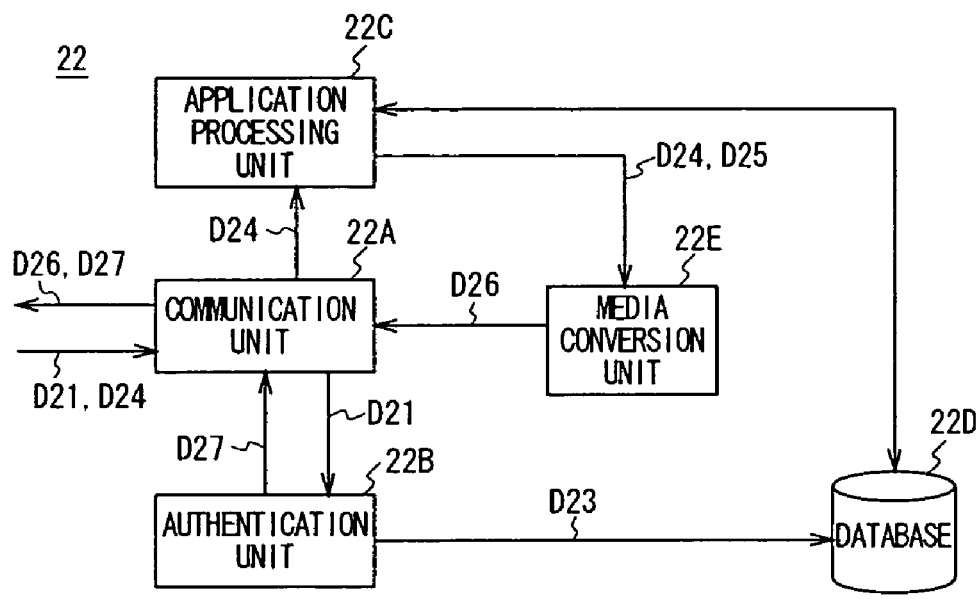
FIG. 8 is a block diagram showing the construction of the specified server.

The specified server 22, as shown in FIG. 8, receives the authentication request data D2 transmitted from the user operating television set 13 and supplies the received authentication request data D21 to the authentication unit 22B.

When contents of the authentication request data D21, the user ID and password agree with the preregistered data of the authorized user, the authentication unit 22B judges that the user operating the dispatching side (i.e., television set 13) of the authentication request data D21 is the authorized user, and registers informations to specify the user (user ID and password), that is the content of the authentication request data D21, information for terminal specification to specify the terminal device (the television set 13) operated by the user terminal type data, data to specify the dispatching means, the sender's telephone number and various optional data of the television set side) to the database 22D as the user and operating terminal combined data D23. At this point, when the existing composite data is stored in the database 22D, the database 22D renews data by writing the new composite data D23 supplied from the authentication unit 22B over the existing composite data.

Thus, in every time when the specific user operates new terminal device changing devices, the combined data of the terminal device to be operated and the user data will be registered in the database 22D.

With this arrangement, if it is determined that the authentication request is from the authorized user at the authentication unit 22B, the authentication unit 22B sends back authentication answer data D27 to the user operating terminal device (television set 13) via the communication unit 22A (FIG. 7).

Thus, in the specified server 22 the terminal device, that is currently being used by the user, (television set 13) is registered with the user data combined. The information thus registered in the database 22D of the specified server 22 will remain in the database 22 even when the connection between the terminal device to be used by the user and the specified server 22 is cut off.

At this point, in the application processing unit 22C of the specified server 22, messages such as electronic mails to be mailed to the specified user from various terminal devices will be stored. And in the case of returning the authentication answer data D27 in response to the authentication request data D21 described above in FIG. 7, to the television set 13, if the message to the user who operates the television set 13 is arrived at the application processing unit 22C, the application processing unit 22C obtains the terminal device (television set 13) to be used by the user from the combined data of the database 22C according to a transmission command from the authentication unit 22B, and supplies the message to the user D25 and the type data of the terminal device to the media conversion unit 22E.

The media conversion unit 22E converts the message to the user D25 to the data format corresponding to the type of terminal device to be used by the user (television set 13) and transmits this through the communication unit 22A as the notification data D26 to the terminal device to be used by the user (television set 13) via the telephone line 15.

Thus, when the user inserts the memory card 11 to the television set 13 and registers the user's address to the specified server 22, the message to the user will be displayed on the CRT 13G of the television set 13.

In this connection, when the user inserts the memory card 11 onto the television set 13, instead of transmitting the message to the user to the television set 13 from the specified server 22, information just notifying the arrival of the message to the user can be transmitted. With this arrangement, the CPU 13A of the television set 13 can display such as "xx electronic mails have been arrived" on the CRT 13G and thus the CPU 13A can inform the arrival of message to the user.

At the time when transmitting the authentication request data D21 to the specified server 22 from the television set 13 described above in FIG. 7, the authentication request data D21 can be encrypted by a cypher algorithm forming one-directional random pattern called as MD5 for example. By transmitting such encrypted authentication request data D21, the data required for authentication such as the user ID and password can be prevented from tapping.

Thus, when the user inserts the memory card 11 into the slot of the television set 13 by using the television set 13, the user specific information and the specific information on the terminal device to be used at that time (television set 13) are registered on the specified server 22 combined, and thus, the specified server 22 can grasp whereabouts of the user.

Figure 9:
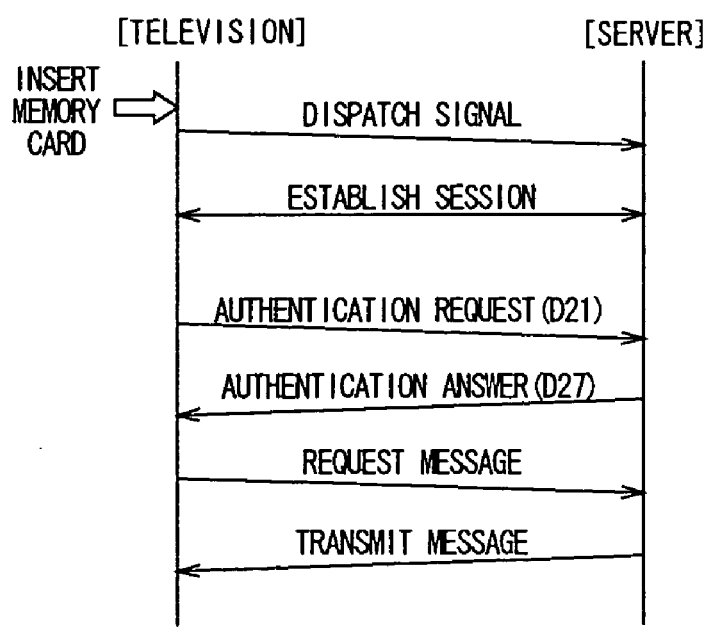
FIG. 9 is a brief linear diagram showing the authentication sequence between the television set and the server.

In this connection, in the authentication sequence of FIG. 7, a message to the user is transmitted to the television set 13 from the specified server 22 when the user inserts the memory card 11 to the television set 13. However, instead, as shown in FIG. 9, the user, by transmitting the message request to the specified server 22 by operating the operation unit (not shown in Fig.) of the television set 13, the message to the user can be transmitted from the specified sever 22 to the television set.

Figure 10:
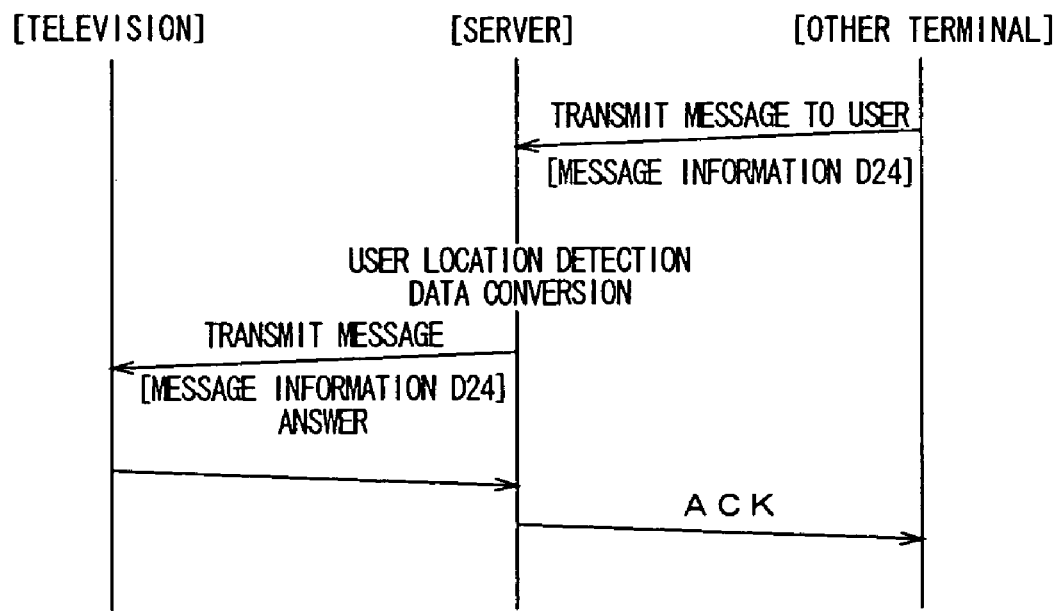
FIG. 10 is a brief linear diagram showing the message transmission procedure.

As shown in FIG. 10, if the message information D24 to the user (FIG. 8) is transmitted from the other terminal devices to the specified server 22 under the condition in which the user inserts the memory card 11 into the television set 13 and registers the user's whereabouts to the specified server 22, the specified server 22 transmits this to the application processing unit 22C after receiving the message at the communications unit 22A. The application processing unit 22C detects the user's address from the database 22D based on the specific information of the user (such as user ID), who is the addressee of the message information D24 contained in the message information D24.

Then, the application processing unit 22C supplies the resulting information showing the user's address (television set 13), information showing the type of terminal device and the message information to the user D24 to the media conversion unit 22E.

The media conversion unit 22E converts the message to the user D24 to the data format corresponding to the type of the terminal device (television set 13) that the user uses at that time and transmits this through the communication unit 22 as the communication data D26 to the terminal device to be used by the user (television set 13) via the telephone line 15.

Accordingly, the specified server 22, by transmitting the message such as electronic mail mailed specifying the user from the other terminal device to the user's address, the television set 13, can transmit the message to the addressee user.

Thus, since the television set 13 displays the electronic mail transmitted from the specified server 22 on the screen of the CRT 13G, the user using the television set 13 can confirm the electronic mail to the user on the display screen of the television set 13.

The television set 13 received the message D24 transmits an answer signal to the specified server 22, and responding this the specified server 22 informs the receipt of the message D24 at the television set 13 to the terminal that is the dispatcher of the message D24 by ACK (acknowledge).

In this connection, if the user conducts the predetermined input operation when the user inserts the memory card 11 into the television set 13, the CPU 13 of the television set 13 reads out the television program column and URL information stored in the fourth area AR14 in the memory card 11 described above in FIGS. 4 and 5 based on the data type information D11 and D13A having the TLV format data structure, and displays as required. Moreover, if the information such as television program column and URL are not stored in the fourth area AR14, the CPU 13A can store the most up-to-date information by sending the transmission request to the service provider 21. As the method to store such information, instead of sending out the transmission request from the television set 13 to the service provider 21, the service provider 21 can transmit information to the television set 13 at regular intervals.

When the user pulls out the memory card 11 from the slot of the television set 13, the contact point for detection of the memory card 11 is separated from the contact point of the slot of memory card interface 13. And the interface processing unit 13N detects changes of the signal level for memory card detection (change from the logical "H" level to the logical "L" level) and transmitting an interrupt signal to the CPU 13A, conducts the interrupt processing. Thus, the CPU 13A detects that the memory card is extracted.

Figure 11:
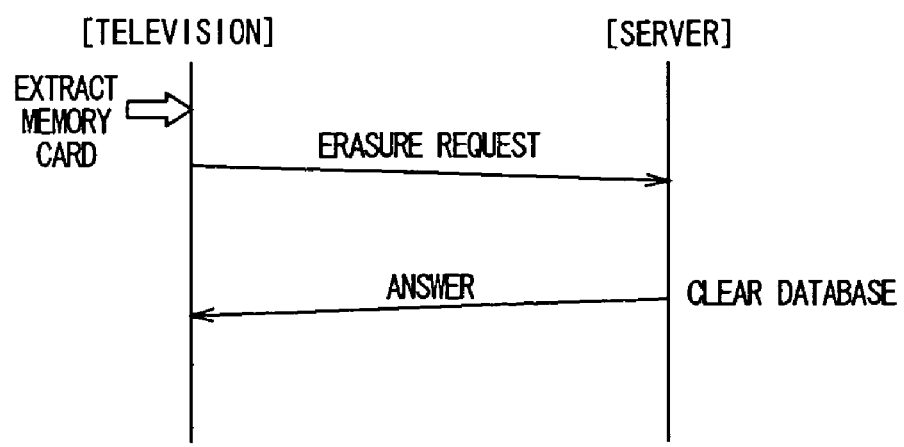
FIG. 11 is a brief linear diagram showing the sequence when the memory card is extracted.

At this point, as shown in FIG. 11, the CPU 13A transmits an erasure request containing the user ID and the terminal type data (data showing the type of television set 13) to the specified server 22, and upon receiving this message, the authentication unit 22B of the specified server 22 erases the composite data of the user data and the terminal data (television set 13) registered in the database 22D, and transmits an answer signal to the television set 13. Thus, the television set 13 from which the memory card 11 is pulled out will be erased from registration as the user operating terminal device (location) in the database 22D of the specified server 22.

Figure 12:
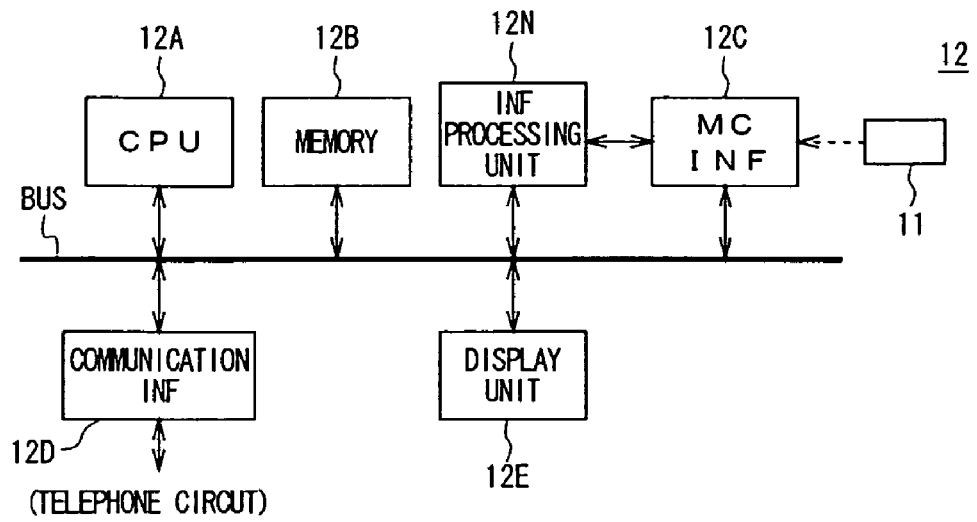
FIG. 12 is a block diagram showing the construction of a personal computer.

Furthermore, as shown in FIG. 12, the personal computer 12 as the second terminal device is comprised of a CPU 12A, memory 12B, memory card (MC) interface (INF) 12C, interface processing unit 12N, communication interface (INF) 12D and a display unit 12E which are connected to the data bus BUS. The CPU 12A conducts various operations according to operational programs stored in the memory 12B and controls each circuit corresponding to the operations. The contents of various processings of the CPU 12A will be displayed on the display unit 12E formed with such as crystal display panel.

When the user operating the personal computer 12 inserts his own memory card 11 into the slot for memory card, the contact point for the memory card 11 detection is connected to the contact point of the memory card interface 12C. And then, the interface processing unit 12N detects changes of the signal level for memory card detection (from the logical "L" level to the logical "H" level), and thus sending out an interrupt signal to the CPU 12A, conducts the interrupt processing. Thus, the CPU 12A detects that the memory card 11 is inserted. In this connection, the interface processing unit 12N is a processing block to conduct the protocol processing according to the interface specifications in receiving data with regard to the memory card 11. With this arrangement, the interface processing unit 12N becomes in a state capable of reading out the user specific information.

At this point, the CPU 12A reads out data in the memory card 11 via the memory card interface 12C, and by transmitting this to the specified server 22 of the service provider 21 via the communication interface 12D, the modem 14 (FIG. 2) and the telephone line 15 (FIG. 2), conducts an authentication request to the specified server 22.

This authentication request sequence will be conducted as follows: When the memory card 11 is loaded onto the personal computer 12, the CPU 12A detects the loading condition of the memory card 11 via the memory card interface 12C and dispatches signal to the service provider 21 having the specified server 22 via the telephone line 15 and secures the communication path as in the case of the authentication request sequence in the television set 13 described above in FIG. 7.

Then, the CPU 12A of the personal computer 12, after establishing the session according to the Point to point protocol (PPP) processing, transmits an authentication request to the specified server 22. As this authentication request data D21 (specific information), the CPU 12A transmits the information for user specification consists of the user ID and password for authentication in the network connection information (FIG. 4) stored in the memory card 11, the terminal type data (data showing the personal computer) stored in the memory 12B of the personal computer 12, information to specify the dispatching means, and the information for terminal specification formed of sender's telephone number and various option data of the personal computer side to the specified server 22.

The specified server 22 receives the authentication request data D21 to be transmitted from the user operating personal computer 12 at the communication unit 22A and supplies the authentication request D21 received to the authentication unit 22B.

In the case where contents of the authentication request data D21 such as the user ID and password agree with the authorized user data registered in advance, the authentication unit 22B judges the user operating the transmitting side of the authentication request data D21 (i.e., personal computer 12) at that time as the authorized user and registers the information to specify the user (user ID and password), these are contents of authentication request data D21, and the information for terminal specification (terminal type data, information to specify the transmission means, the sender's telephone number and various option data of the personal computer side) to specify the user operating terminal device (personal computer 12) in the database 22D as the composite data D23 in which the user data and the terminal are combined. At this point, if existing combined data is stored in the database 22D, the database 22D writes newly combined data D23 to be supplied from the authentication unit 22B over the existing data and updates the data with the new composite data D23.

Thus, at this point, the registration showing that the user will use the personal computer 12 is conducted into the database 22D.

Here, in the application processing unit 22C of the specified server 22, messages such as electronic mails to be mailed to the specific user from various terminal devices are stored. In the case of transmitting the authentication answer data D27 corresponding to the authentication request data D21 to be transmitted to the specified server 22 from the personal computer 12 to the personal computer 12 from the specified server 22, if the message information to the user who is operating the personal computer 12 is arrived at the application processing unit 22C, the application processing unit 22C obtains the terminal device to be used by the user (personal computer 12) from the composite data of the database 22D by the transmission command from the authentication unit 22B and supplies the message to the user D25 and type data of the terminal device to the media conversion unit 22E.

The media conversion unit 22E converts the message information D25 to the data format corresponding to the type of terminal device (personal computer 12) and transmits this through the communication unit 22A to the terminal device to be used by the user (personal computer 12) as a message data D26 via the telephone line 15.

Thus, when the user, inserting the memory card 11 into the personal computer, registers his address to the specified server 22, the message to the user is displayed on the display unit 12E of the personal computer 12.

In this connection, when the user inserts the memory card into the personal computer 12, the message information just informing that the message to the user has been arrived can be transmitted to the personal computer 12, instead of transmitting the message itself to the personal computer 12 from the specified server 22. With this arrangement, when the user inserts the memory card 11 into the personal computer 12, the CPU 12A of the personal computer 12 can display the message such as "xx electronic mails have arrived" on the display unit 12E and can inform the user that messages are arrived.

In the case of transmitting the authentication request data D21 to the specified server 22 from the personal computer, the authentication request data D21 can be encrypted by the cypher algorithm forming one directional random pattern called as MD5. And by transmitting such encrypted authentication request data D21, tapping of the data necessary for authentication such as the user ID and password can be prevented.

Thus, at the time when the user using the personal computer 12, by inserting the memory card 11 into the slot of the personal computer 12, the user specific information and the terminal specific information (personal computer 12) can be registered in the specified server 22 as a set. And thus, the specified server 22 can grasp the user's whereabouts.

In this connection, the authentication sequence described above has dealt with the case of transmitting the message to the user from the specified server 22 to the personal computer 12 when the user inserts the memory card 11 to the personal computer 12. However, as in the case of television set 13 described above in FIG. 9, the user transmitting the message request to the specified server 22 by operating the keyboard (not shown in Fig.) of the personal computer 12, the message to the user can be transmitted to the personal computer 12 from the specified server 22.

At this point, as in the case of television set 13 described above in FIG. 10, under the condition in which the user inserts the memory card 11 into the personal computer 12 and registers the user's whereabouts to the specified server 22 (FIG. 8), if the message information D24 to the user is transmitted to the specified server 22 from other terminal devices, the specified server 22, upon receiving the message information D24 at the communication unit 22A, sends this out to the application processing unit 22C. The application processing unit 22C detects the user's address from the database 22D based on the user specific information (such as user ID) contained in the message information D24.

Then, the application processing unit 22C supplies the resulting information showing the user's address (personal computer 12), and information showing the type of terminal device and the message information to the user D24 to the media conversion unit 22E.

The media conversion unit 22E converts the message information to the user D24 to the data format corresponding to the type of terminal device that the user uses (personal computer 12) and transmits this through the communication unit 22A to the terminal device to be used by the user (personal computer 12) as a message data D26 via the telephone line 15.

Accordingly, the specified server 22, by transmitting the message such as electronic mails mailed from the other terminal device by specifying the user to the personal computer 12, that is the user's address, can transmits the message information to the addressee user.

Thus, since the personal computer 12 displays the electronic mail transmitted from the specified server 22 on the screen of the display 12E, the user using the personal computer 12 can confirm the electronic mail to the user on the display screen of the display unit 12E of the personal computer 12.

The personal computer 12 upon receipt of the message information D24, transmits an answer signal to the specified server 22, and responding this, the specified server 22 informs the receipt of message information D24 at the personal computer 12 to the sender terminal of the message information D24 by ACK (acknowledge).

When the user pulls out the memory card 11 from the slot of personal computer 12, the contact point for detection of the memory card 11 is separated from the contract point of the slot of the memory card interface 12C, the interface processing unit 13N detects changes of the signal level for memory card detection (change from the logical "H" level to the logical "L" level), and by transmitting an interrupt signal to the CPU 12A, conducts the interrupt processing. Thus, the CPU 12A detects that the memory card 11 is extracted.

At this point, since the CPU 12A transmits an erasure request containing the user ID and terminal type data (data showing the type of the personal computer 12) to the specified server 22 as in the case of television set 13 described above in FIG. 11, the authentication unit 22B upon receiving this, erases the user and terminal device (personal computer 12) combined data and sends back an answer signal to the personal computer 12. The personal computer 12 from which the memory card 11 is extracted will be deleted from the registration as the user's operating terminal device (location) in the database 22D of the specified server 22.

In this connection, when the personal computer 12 is connected by the small office/home office (SOHO) router in place of the modem 14, if the Network address translation (NAT) to convert the private address and global address, the dynamic host configuration protocol (DHCP) to allocate IP address dynamically or IP masquerade would be used, it becomes difficult for the specified server 22 to uniquely identify the terminal. And in this case the name of personal computer can be included in the authentication request data and transmitted to the specified server 22 from the personal computer 12.

Accordingly, in this case, when the user inserts the memory card 11 into the personal computer 12, the personal computer 12 transmits user specifying information formed of user ID and password for authentication in the network connection information (FIG. 4) stored in the memory card 11, the terminal type data (data showing the personal computer) stored in the memory of the personal computer 12 in advance, information to specify the signal dispatching means (such as ISDN), sender's telephone number, Internet protocol (IP) address of the personal computer 12, the name of personal computer 12 and terminal specifying information formed of various option data to the specified server 22 as the authentication request data. With this arrangement, the specified server 22 can uniquely identify the personal computer 12.

On the other hand, the personal computer 47 connected to the network 45 built in the company has the similar construction to that of the personal computer 12 described above in FIG. 9. However, in this case, since the network 45 is connected to the Internet 41 by the private line, the personal computer 47 connected to the network 45 is in a state the session to the service provider 21 is established. Accordingly, when the user inserts the memory card 11 into the personal computer 47, he can directly enter the authentication processing.

In this case, since the communication regulations of the internet 41 is determined according to the transmission control protocol/Internet protocol (TCP/IP), the authentication request to the specified server 22 from the personal computer 47 is conducted by the same protocol (TCP/IP).

Furthermore, in the case where the network 45 is guarded by the firewall 46, the authentication request data containing attribute information of the firewall 46 must be supplied to the specified server 22 from the personal computer 47. Accordingly, when the user inserts the memory card 11 into the personal computer 47, the personal computer 47 transmits the user specifying information formed of user ID and password for identity in the network connection information (FIG. 4) stored in the memory card 11, terminal type data (data showing the personal computer) stored in the memory of the personal computer 47 in advance, information to specify dispatching means (private line), firewall attributes such as SOCKS to keep the network security, Internet protocol (IP) address of the personal computer 47, and terminal specifying information formed of the name of terminal and various option data to the specified server 22 as the authentication request data.

With the above arrangement, the specified server 22 can identify the personal computer 47 in the network 45.

In this connection, if the user conducts the predetermined input operation under the condition in which the user inserts the memory card 11 into the personal computer 12, the CPU 12A of the personal computer 12 reads out telephone directory data and address book data stored in the third area AR13 in the memory card 11, described above in FIGS. 4 and 5, based on the data type information D11 and D13A having the TLV format data structure, and displays on the display unit 12E as required. Moreover, if information is not stored in the third area AR13, the CPU 13A can store a variety of information into the area according to the user's input operation.

Figure 13:
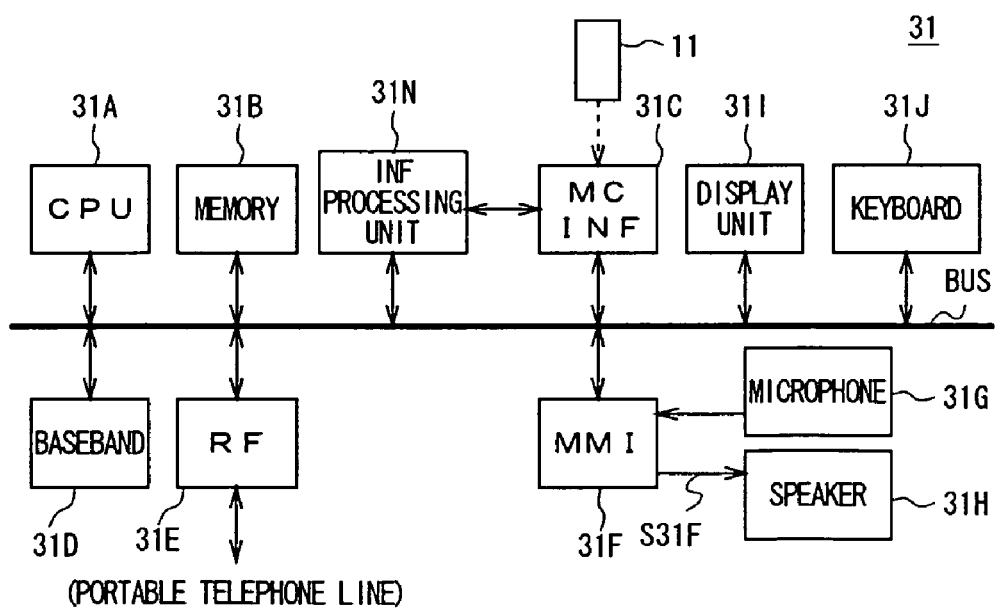
FIG. 13 is a block diagram showing the construction of a portable telephone.

Furthermore, as shown in FIG. 13, the portable telephone 31 as the third terminal device is comprised of a CPU 31A, memory 31B, memory card (MC) interface 31C, interface processing unit 31N, signal receiving/transmitting unit (RF) 31E to receive/transmit signal between the portable telephone line 33, baseband processing unit 31D to convert the radio frequency (RF) received at the receiving/transmitting circuit 31E to the baseband signal as well as converting the baseband signal to the RF signal, man machine interface (MMI) unit 31F that is an interface between the microphone 31G and speaker 31H, display unit 31I and keyboard 31J connected respectively.

The CPU 31 executes various operations according to the operational program stored in the memory 31B, and controls each circuit depending upon the operations. The contents of various processings of the CPU 31A will be displayed on the display unit 31J formed by such as crystal display panel as required.

When the user enters the telephone number of the desired calling destination, the keyboard 31J transmits the data showing the telephone number to the CPU 31A. The CPU 31A transmits a connection request to the calling destination shown by the telephone number entered by the user via the receiving/transmitting circuit 31E. At this time, the portable telephone circuit 33 connects the line in response to the answer of the calling destination. When the line is connected, the receiving/transmitting circuit 31E supplies the RF signal from the calling destination received via an antenna (not shown in Fig.) to the baseband processing unit 31D and converts the RF signal to the baseband signal. And the baseband processing unit 31D, by supplying the converted baseband signal to the MMI unit 31F, outputs audio signal from the calling destination received from the speaker 31H as sounds.

Moreover, when the user enters sounds via a microphone 31G, the MMI unit 31F supplies an input audio signal supplied from the microphone 31G to the baseband processing unit 31D, and here it converts the baseband signal to the RF signal. And the baseband processing unit 31D, by transmitting the converted RF signal to the portable telephone line 33 via the receiving/transmitting signal circuit 31E, transmits the RF signal to the circuit-connected called party. Thus, the user using the portable telephone 31 can receive and/or transmit conversations and a variety of informations between the called party.

At this point, when the user operating the portable telephone 31 inserts his memory card 11 into the slot for memory card (not shown in Fig.) of the portable telephone 31, the detecting contact point of the memory card 11 is connected to the contact point of the memory card interface 31C. And the interface processing unit 31N detects changes of the signal level for memory card detection (change from the logical "L" level to the logical "H" level), and by transmitting an interrupt signal to the CPU 31A, conducts the interrupt processing. Thus, the CPU 31A detects that the memory card 11 is inserted. The interface processing unit 31N is a processing block to conduct the protocol processing according to the interface specifications when receiving data with regard to the memory card 11. Thus, the interface processing unit 31N becomes in the state capable of reading out the user specific information memorized in the memory card 11.

At this point, the CPU 31A reads out data in the memory card 11 via the memory card interface 31C, and by transmitting this to the specified server 22 of the service provider 21 via the receiving/sending circuit 31E, base station 32 (FIG. 2) and the portable telephone line 33 (FIG. 2), conducts the authentication request to the specified server 22.

When the memory card 11 is inserted in the portable telephone 31 as in the case of the authentication request sequence described above in FIG. 7, the CPU 31A detects the loading condition of the memory card 11 via the memory card interface 31C, and transmitting signal to the service provider 21 having the specified server 22 via the portable telephone line 33, secures the communication path.

The CPU 31A of the portable telephone 31, upon establishing the session by the information receiving/sending signal means stored in the portable telephone 31, such as point to point protocol (PPP) processing and wireless application protocol (WAP), transmits authentication request to the specified server 22. In this connection, in the case where the portable telephone 31 is not equipped with the PPP and WAP protocol function, circuits will be connected by such as Dual tone multiple frequency (DTMF) protocol.

Then, the CPU 31A transmits the user specifying information formed of user ID and password for authentication in the network connection information (FIG. 4) stored in the memory card 11, terminal type data stored in the memory 31B of the portable telephone 31 in advance (data showing the personal digital cellular (PDC) telephone), information to specify the PDC, the telephone number of the caller of the PDC telephone 31 side, protocol information such as WAP used when connecting, and the terminal specifying information formed of various option data to the specified server 22 as the authentication request data D21 (specific information).

As described above in FIG. 8, the specified server 22 receives the authentication request data D21 to be transmitted from the user operating personal cellular telephone 31 at the communications unit 22A and supplies the received authentication request data D21 to the authentication unit 22B.

In the case where the contents of authentication request data 21 such as the user ID (certification ID) and the password agree with the data of the authorized user registered in advance, the authentication unit 22B judges that the user operating the dispatching source of the authentication request data D21 entered at this moment (i.e., portable telephone 31) is the authorized user, and registers user specifying information (user ID and password), that is the content of authentication request data D21, the terminal specifying information to specify the user operating the terminal device (portable telephone 31) in the database 22D as the user and the operating terminal combined data D23 (terminal type data, information to specify the dispatching means, sender's telephone number of the portable telephone side and various option data). At this time, if the existing combined data is stored in the database 22D, the database 22D updates the data to the new combined data D23 to be supplied from the authentication unit 22B writing this over the existing composite data at this moment.

Thus, at this point, the data that the user will use the portable telephone 31 is registered in the database 22D.

At this point, message information such as electronic mail to be mailed from various terminal devices to the specific user will be stored in the application processing unit 22C of the specified server 22. And when returning the authentication answer data D27 corresponding to the authentication request data D21 to be transmitted to the specified server 22 from the portable telephone 31 to the portable telephone 31 from the specified server 22, if the message to the user operating the portable telephone 31 is arrived at the application processing unit 22C, the application processing unit 22C obtains the user using terminal device (portable telephone 31) from the combined data of the database 22D by the transmission command from the authentication unit 22B, and supplies the message information D25 and the type data of terminal device to the media conversion unit 22E.

The media conversion unit 22E converts the message to the user D25 to the data format corresponding the type of terminal device (portable telephone 31) to be used by the user at this time and transmits this to the terminal device (portable telephone 31) to be used by the user via the communications unit 22A as a message data D26.

Thus, at the time when the user inserting the memory card 11 into the portable telephone 31, registers the user's whereabouts in the specified server 22, the message to the user will be displayed on the display unit 311 of the portable telephone 31.

In this connection, the embodiment described above has dealt with the case of transmitting the message to the user itself to the portable telephone 31 from the specified server 22 when the user inserts the memory card 11 in the portable telephone 31. However, the message just to inform the user that the message has arrived can be transmitted to the portable telephone 31. With such arrangement, when the user inserts the memory card 11 in the portable telephone 31, the CPU 31A of the portable telephone 31 can display such as "xx electronic mails have arrived" on the display unit 311 and inform the user that messages are arrived.

In the case of transmitting the authentication request data D21 to the specified server 22 from the portable telephone 31, the authentication request data D21 can be encrypted by the cipher algorithm forming one directional random pattern called as MD5 for example. By transmitting the encrypted authentication request data D21, tapping of data necessary for authentication such as the user ID and password can be prevented.

Thus, since the user inserts the memory card 11 in the slot of the portable telephone 31 when using the portable telephone 31, the user specific information and the terminal specific information of the terminal device (portable telephone 31) to be used can be registered in the specified server 22 as a set. And thus, the specified server 22 can grasp the user's whereabouts.

In this connection, in the authentication sequence described above has dealt with the case of the specified server 22 transmitting the message for the user to the portable telephone 31 when the user inserts the memory card 11 in the portable telephone 31. However, the user transmitting the message request to the specified server 22 by operating the keyboard (not shown in Fig.) of the portable telephone 31, the message to the user can be transmitted from the specified server 22 to the portable telephone 31 as in the case of television set 13 described above in FIG. 9.

At this point, under the condition in which the user inserts the memory card 11 in the portable telephone 31 and the user's address is registered in the specified server 22 as in the case of the television set 13 described above in FIG. 10, if the message to the user D14 (FIG. 8) is transmitted from other terminal device to the specified server 22, the specified server 22 receives the message D24 at the communications unit 22A and transmits this to the application processing unit 22C. The application processing unit 22C detects the user's address from the database 22D based on the specific information (such as user ID) of the user, who is the addressee of the message D24 contained in the message D24.

Then, the application processing unit 22C supplies the resulting information showing the user's address (portable telephone 31) and information showing the type of terminal device and the message to the user D24 to the media conversion unit 22E.

The media conversion unit 22E converts the message to the user D24 to the data format corresponding to the type of terminal device to be used by the user (personal computer 12) and transmits this to the terminal device to be used by the user (portable telephone 31) via the communications unit 22A as the message data D26 through the portable telephone line 33.

Accordingly, the specified server 22, by transmitting the message information such as electronic mails mailed to the user from the other terminal device to the portable telephone 31, can transmit the message information to the user, the addressee of this message.

Thus, the portable telephone 31 displaying the electronic mail transmitted from the specified server 22 on the screen of the display unit 31I, the user using the portable telephone 31 can confirm the electronic mail to the user on the display screen of the display unit 31I.

The portable telephone 31 receiving the message information D24, transmits an answer signal to the specified server 22, and responding this the specified server 22 informs the receipt of the message information D24 at the portable telephone 31 with ACK (acknowledge) to the terminal device, the sender of the message D24.

When the user pulls out the memory card 11 from the slot of the portable telephone 31, the contact point for detection of the memory card 11 is separated from the contact point of slot of the memory card interface 31C. And then the interface processing unit 31N detects the change (the change from the logical "H" level to the logical "L" level) of the signal level for memory card for detection, and transmitting an interrupt signal to the CPU 31A, conducts the interrupt processing. Thus, the CPU 31A detects that the memory card 11 is extracted.

At this point, the CPU 31A transmits an erasure request containing the user ID and terminal type data (data showing the type of portable telephone 31) to the specified server 22 as in the case of television set 13 described above in FIG. 11. And the specified server 22 receiving this request, erases the user and terminal device (portable telephone 31) combined data and sends back an answer signal to the portable telephone 31. With this arrangement, the portable telephone 31 from which the memory card 11 is pulled out is erased from the registration as the user operating terminal device (location) in the database 22D of the specified server 22.

In this connection, in a state in which the user inserts the memory card 11 in the portable telephone 31, if the user conducts the predetermined input operation, the CPU 31A of the portable telephone 31 reads out the telephone directory data and address book data stored in the third area AR13 in the memory card 11 described above in FIGS. 4 and 5 based on the data type) information D11 and D13A having the TLV format data structure, and displays these on the display unit 31I as required. Moreover, if the telephone directory data and address book data are not stored in the third area AR13, the CPU 13A can store various informations in the area by the user's input operation.

Accordingly, in the case of using either one of terminal devices (television set 13, personal computers 12, 47 or portable telephone 31), the user only inserting the memory card 11 into that terminal device, the authentication request data will be transmitted to the specified server 22 from the terminal device and the terminal device to be used by the user can be confirmed at the specified server 22.

In this case, the specified server 22 specifies the user and the user operating terminal device, and after the completion of the authentication processing, if the line between the terminal and the specified server is cut off, the specified server 22 can specify the user using terminal device.

According to the foregoing construction, the specified server 22 registers the user's address to the database 22D as the information of the user operating terminal device. And when the electronic mail to the user is mailed from the other terminal device, the specified server 22 detects the addressee of the electronic mail, the user's address (i.e., terminal device) from the database 22D.

Thus, since the specified server 22 grasps the user's address in the database 22D, the electronic mail can be transmitted to the addressee of the electronic mail, i.e., the user's address, detected at the database 22D, and as a result, it becomes unnecessary to provide a mail box in each terminal device to be used by the user.

Furthermore, since the user, conducting the authentication processing to the specified server 22 at the time when using the terminal device, registers the terminal device he is using in the database 22D of the specified server 22, the specified server 22 can always grasp the user using terminal device (i.e., the user's whereabouts) even in the case where the user using terminal device is not connected to the network.

Accordingly, even if the terminal device in use by the user is not connected to the network, by detecting the user's address from the database 22C, the user's address (terminal device) can be specified. And thus, message information such as electronic mails to the user can be transmitted to the user.

Furthermore, by controlling the user ID and the user's address (the terminal device in use) by the specified server 22 connected to multiple networks, it becomes unnecessary for the user to have different mail address in each network or the service provider.

In this connection, when the user pulls out the memory card 11 from the terminal device, the CPU of the terminal device detects that the memory card 11 is extracted and informs this to the specified server 22. Thus, the specified server 22 can confirm that the user has completed the use of terminal device and waits for the notice of electronic mail to the user till the user inserts the memory card 11 to either one of terminal devices.

Moreover, by registering the type of terminal device to be used by the user in advance in the specified server 22, the specified server 22 conducts the processing compatible with the terminal device that the user is using. For example, when the user is using the portable telephone 31, if the electronic mail to the user is arrived to the specified server 22, the media conversion unit 22E of the specified server 22 sends an arrival notice of the electronic mail upon converting this to audio signal, to the portable telephone 31 that the user is using. Thus, the user can access to the specified server 22 by using the terminal device (personal computer 12) capable of reading the electronic mail responding to the arrival notice by the sound and can receive the electronic mail.

Moreover, in the case where the user is using the personal computer 12, the specified user 22 can provide the existing processings such as Post office protocol (POP) 3 and Internet message Access protocol (IMAP) 4.

Furthermore, in the case where the user uses the terminal device such as a portable telephone not equipped with the information interface, the specified server 22 can transmit the message information such as electronic mail by using the existing transmission method to the terminal device.

According to the foregoing construction, since the user transmits the authentication request data to the specified server 22 and conducts the authentication processing when he uses the terminal device, the specified server 22 can grasp the user's address (i.e., the terminal device in use).

Furthermore, the embodiment described above has dealt with the case of using the television set 13, personal computer 12, 47 and portable telephone 31 as the terminal device. However, the present invention is not only limited to these but also various other terminal devices can be widely applied.

Furthermore, the embodiment described above has dealt with the case of transmitting the user specific information stored in the memory card 11 to the specified server 22 as authentication request data by inserting the memory card 11 into the terminal device. However, the present invention is not only limited to this but also the authentication request to the specified server 22 can be conducted by the user inputting the user specific information (i.e., user ID, password) to the terminal device directly, instead of using the memory card 11.

Furthermore, the embodiment described above has dealt with the case of providing the specified server 22 in the service provider 21. However, the present invention is not only limited to this but also the specified server connected to the network with various formats can be applied.

Moreover, the embodiment described above has dealt with the case of using the memory card 11 comprised of memory 11A and connector 11B. However, the present invention is not only limited to this but also such as the card with the personal computer memory card international association (PCMCIA) size, or the memory card having CPU can be used. In this case, the CPU of the memory card can output the data of memory 11A according to the terminal device in which the memory card is inserted. Also, the memory means is not only limited to memory cards but also card shaped device or a variety of shapes can be used.

Moreover, the embodiment described above has dealt with the case of the terminal device transmitting the authentication request data to the specified server 22 automatically when the user inserts the memory card 11 into the terminal device. However, the present invention is not only limited to this but also after the user inserting the memory card 11 into the terminal device, the terminal device can transmit the authentication request data to the specified server 22 responding to the user's input operation.

According to the present invention as described above, in the case where the user uses the terminal device, by transmitting the user specific information and the specific information of the terminal device to be used by the user to the network server as the specific information, the network server can specify the terminal device in use by the user.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A network system connecting a plurality of different types of user terminal devices and a network server via a known communication system, wherein each user terminal device comprises:

means for retrieving information from a removable memory loaded into the terminal device, said removable memory storing user specific information and a group identification for identifying plural users of the user terminal device to form a specific group;

means for transmitting said user specific information and information identifying said terminal device as specific information when said removable memory is loaded, wherein said information identifying said terminal device includes terminal type attributes and media type attributes corresponding to the type of terminal device;

means for detecting an extraction of the removable memory from the terminal device based upon changes to an interface signal level from a logical high level to a logical low level; and means for transmitting an erasure request to the network server based on the detected extraction of the removable memory; and said network server comprises:

means for receiving said specific information transmitted by said terminal devices;

means for registering said user specific information and said information identifying said terminal device included in said specific information as registered information, wherein the registered information is erased in response to the erasure request transmitted by the terminal device when said removable memory is extracted from said terminal device;

means for updating said registered information identifying said terminal device corresponding to said user specific information;

means for identifying a second terminal device of the plurality of terminal devices, based on said updated information by said means for updating, currently being used by a user and for authenticating said user at the second terminal by referring to said registered information;

means for transmitting to the authenticated user at the second terminal device currently being used by the authenticated user message arrival data when a removable memory of the user is inserted into the second terminal device currently being used by the authenticated user, wherein the message arrival data indicates message information addressed to an electronic mail address of the authenticated user and stored at the network server, wherein the message information arrived at the network server after a response by the network server to an erasure request transmitted by a first terminal device used by the authenticated user prior to the second terminal device currently being used by the authenticated user and before the updating of the registration information to identify the second terminal device as currently being used by the authenticated user;

means for receiving a confirmation from the authenticated user requesting transmission, to the second terminal device currently being used by the authenticated user, of the message information indicated by the message arrival data;

means for converting message information addressed to said authenticated user from a first data format incompatible with the type of said second terminal device currently being used by said user to a second data format compatible with the type of said second terminal device currently being used by said user based on said terminal type attributes and said media type attributes of said second terminal device currently being used by said user; and means for transmitting the converted message information to said second terminal device currently being used by said user;

wherein, in response to said authenticated user (i) requesting, at the second terminal device currently being used by said authenticated user, the message information stored in the network server and indicated by the message arrival data transmitted from the network server and (ii) switching the removable memory of the user from being loaded into the first terminal device to being loaded into the second terminal device compatible with the second data format, before the message information is transmitted from the network server, the message information indicated by the message arrival data, if in the first data format, is converted to the second data format and is transmitted to the second terminal device.

2. A network system connecting a plurality of different types of user terminal devices owned by a user and a network server via a communication system, wherein each terminal device comprises:

means for retrieving information from a removable memory loaded into the terminal device, said removable memory storing user specific information and a group identification for identifying plural users of the user terminal device to form a specific group;

means for transmitting said user specific information and device information identifying said terminal device from which the user accesses the communication system when said removable memory is loaded, wherein said device information includes terminal type attributes and media type attributes corresponding to the type of terminal device;

means for detecting an extraction of the removable memory from the terminal device based upon changes to an interface signal level from a logical high level to a logical low level; and means for transmitting an erasure request to the network server based on the detected extraction of the removable memory; and said network server comprises:

means for receiving said user specific information and said device information transmitted by said terminal device in which said removable memory is loaded;

means for registering said user specific information and said device information in a table;

means for deleting said device information in the table if the means for receiving receives the erasure request when the removable memory is extracted from a first terminal device of the plurality of terminal devices and for updating the table with device information for a second terminal device of the plurality terminal devices currently being used by a user, means for identifying said second terminal device being used by said user and for authenticating said user at the second terminal by referring to said registered information, means for transmitting to the authenticated user at the second terminal device currently being used by the authenticated user message arrival data when a removable memory of the user is inserted into the second terminal device currently being used by the user, wherein the message arrival data indicates message information addressed to an electronic mail address of the authenticated user and stored at the network server, wherein the message information arrived at the network server after a response by the network server to an erasure request transmitted by the first terminal device used by the authenticated user prior to the second terminal device currently being used by the authenticated user and before the updating of the registration information to identify the second terminal device as currently being used by the authenticated user;

means for receiving a confirmation from the authenticated user requesting transmission, to the second terminal device currently being used by the authenticated user, of the message information indicated by the message arrival data;

means for converting message information addressed to said authenticated user from a first data format incompatible with the type of said second terminal device currently being used by said authenticated user to a second data format compatible with the type of said second terminal device currently being used by said authenticated user based on said terminal type attributes and said media type attributes of said second terminal device currently being used by the user; and means for transmitting said converted message information to said second terminal device currently being used by the user by referring to said updated table;

wherein, in response to said authenticated user (i) requesting, at the second terminal device currently being used by the authenticated user, the message information stored in the network server and indicated by the message arrival data transmitted from the network server and (ii) switching the removable memory of the user from being loaded into the first terminal device to being loaded into the second terminal device compatible with the second data format, before the message information is transmitted from the network server, the message information indicated by the message arrival data, if in the first data format, is converted to the second data format and is transmitted to the second terminal device.

* * * * *